E. A. ASHCROFT.
PROCESS FOR RECOVERING VALUES FROM ORES.
APPLICATION FILED SEPT. 15, 1920.
1,388,086.                                  Patented Aug. 16, 1921.
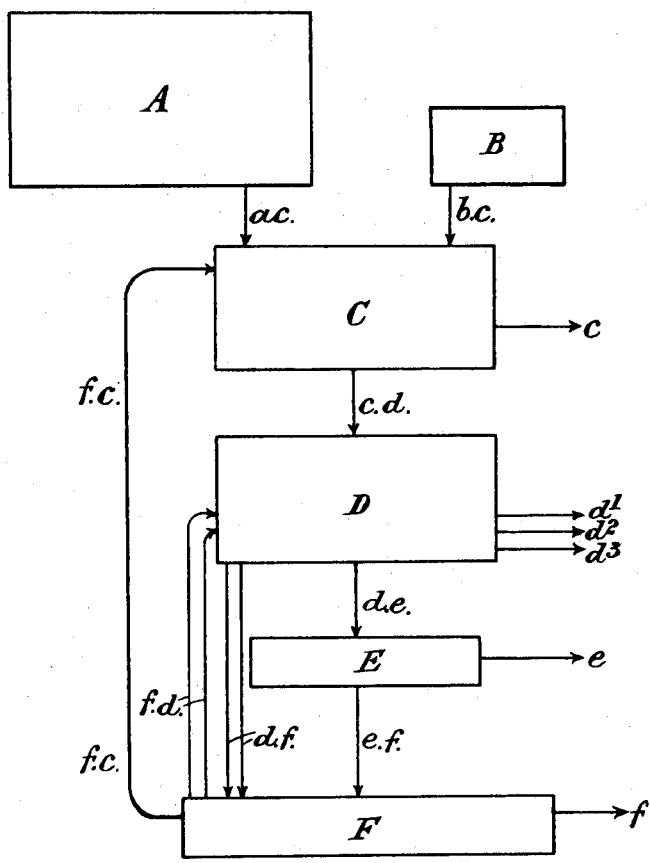
INVENTOR
EDGAR ARTHUR ASHCROFT
BY
ATTORNEYS

UNITED STATES PATENT OFFICE.

EDGAR ARTHUR ASHCROFT, OF LONDON, ENGLAND.

PROCESS FOR RECOVERING VALUES FROM ORES.

1,388,086.     Specification of Letters Patent.     Patented Aug. 16, 1921.

Application filed September 15, 1920. Serial No. 410,537.

*To all whom it may concern:*

Be it known that I, EDGAR ARTHUR ASHCROFT, a subject of the King of Great Britain, residing at 65 London Wall, in the city of London, England, and of Waye, near Ashburton, Devonshire, England, have invented new and useful Processes for Recovering Values from Ores, of which the following is a specification.

According to my invention I provide an improved process for the treatment of metal-bearing ores, or other metal-bearing materials, so as to obtain the valuable, or desired, constituents thereof, the said process consisting in converting the metal constituents of the ore, or other material, into chlorids, which is preferably effected by acting on the ore, or other material, while suspended in a mobile fused melt, or emulsion, in a converter, or analogous vessel, with chlorin, or chlorin yielding gas, (with, or without, the recovery of the discharged sulfur, or sulfur compounds) and fractionally precipitating the metals (such, for example, as silver, lead, and zinc) which it is desired to recover by employing alloys of lead, or zinc, with magnesium, calcium, sodium, or potassium, and removing the gangue from the chlorids by filtration, or other means, (this removal being done either before, or after, fractionally precipitating the metals) and afterward electrolyzing the resulting chlorids with cathodes of the heavy metals so as to re-form the alloys for re-use.

My invention is applicable to the treatment of a great variety of metal-bearing ores, or other materials, but is especially applicable to the extraction of the non-ferrous metals and the recovery of sulfur from all classes of sulfid ores, or products of concentration, and more especially from the class of ores, or products of concentration known as refractory, or complex, ores, concentrates, middlings, tailings, slimes, and the like.

If iron and manganese, or either of them, be present in the ores, or other materials treated, the ferrous, or manganous, chlorids, or both, should be converted into oxids, which can be done by precipitating with magnesia, lime, soda, or potash, in the presence of chlorin, or analogous reagent.

As examples of materials suitable for the process I instance two typical mineral products of the class known respectively as "zinc concentrates" and "lead concentrates" which are among the most important sources of zinc and lead respectively at present worked. Such concentrates are obtained by concentrating the mixed sulfid ores of natural deposits; for instance, the well known Broken Hill deposits. They may contain (besides some gold and silver) approximately:—

*Zinc concentrates.*

|  | Per cent. |
|---|---|
| Lead | 7.0 |
| Zinc | 48.0 |
| Iron | 9.0 |
| Manganese | 1.1 |
| Alumina | 0.2 |
| Calcium | 0.36 |
| Sulfur | 30.0 |
| Insoluble matter | 4.34 |
|  | 100.00 |

*Lead concentrates.*

|  | Per cent. |
|---|---|
| Zinc | 10.0 |
| Lead | 68.0 |
| Sulfur | 15.0 |
| Gangue and sundry | 7.0 |
|  | 100.00 |

A typical deposit of natural ore existing in large quantities in Burma, and known as "Burma Corporation ore," is also very suitable for treatment according to my process.

It contains approximately:—

|  | Per cent. |
|---|---|
| Silver 20 to 40 ounces say | 1 |
| Lead | 40 |
| Zinc | 20 |
| Iron | 3 |
| Sulfur | 18 |
| Silicious gangue | 18 |
|  | 100 |

Many similar ores are found throughout the world and some deposits of such ores contain also varying quantities of antimony, arsenic, copper, nickel, cobalt, or other, sometimes valuable and sometimes troublesome, constituents.

It is well known that the treatment of such ores, has, for many years, presented great difficulties to metallurgists and, even at the present time, in spite of the improved methods employed, only incomplete recoveries can be obtained and the metallurgical processes are both troublesome and expensive.

By my present invention I completely overcome these difficulties and thus render the treatment of all such ores, or other materials, both quite practical and economical.

My invention is especially suitable for treating in a completely efficient and very economical manner all such ores, or concentrates thereof, but I do not limit my invention to the treatment of these particular materials as I can treat them or other ores, or products, with, or without, concentration, or other preliminary treatment including the large class of ores known as oxidized ores of lead, or zinc. For brevity I hereinafter refer to the matters to be treated as the ore.

I may employ as the mobile melt in the converter anhydrous magnesium chlorid, or anhydrous calcium chlorid, or fused sodium chlorid, or potassium chlorid, or mixtures of any of them, and, after, or before, the elimination of the gangue (and the iron and manganese if any, as oxids) I can precipitate the metals (silver, lead, and zinc) fractionally from the mixture of chlorids produced in the converter by adding suitable proportions of metallic alloys consisting of lead, or zinc, alloyed with either magnesium, calcium, sodium, or potassium, to precipitate all the heavy metals; for instance, first the silver with a small portion of lead, (to form a rich bullion) secondly the remainder of the lead and thirdly the zinc. If gold be present it is precipitated with the silver and can be readily recovered by known means of separation. Chlorids are simultaneously formed of the precipitating metal, or metals, of the alloys employed.

After the fractional precipitation of the non-ferrous heavy metals the melt will consist of, or comprise, chlorids of magnesium, calcium, sodium, or potassium, and small quantities of other substances taken from the ore which may be present as inert impurities. Fluorids of magnesium, calcium, sodium, or potassium, may also be present in small quantities.

As the heavier alloying, and non-reactive, metals for employment with the light active precipitating metals magnesium, calcium, sodium, or potassium, I use by preference lead, or zinc, lead, or zinc, being employed when the object of the precipitation is the recovery of gold, silver, or lead and zinc being used when the object of the precipitation is the recovery of zinc. In this way I obtain pure metals of both kinds, or, in the case of the precious metals, rich lead bullions suitable for economical refining.

The fractional precipitation of the metals by magnesium, calcium, sodium, or potassium, alloyed with lead, or zinc, may conveniently take place in a second vessel provided with an agitator, or in a rotating drum, and such vessel, or drum, may be provided with wells and outlets, or may be tipped so that the metal, as it is produced, can be completely poured off through openings provided for the purpose, or alternatively the whole series of operations may take place in one converter worked intermittently. It will be obvious also that, instead of precipitating the heavy metals fractionally, they may, if preferred, be all precipitated together, and be subsequently separated from the resulting mixed alloy.

Likewise when copper, nickel, antimony, arsenic, cobalt, tellurium, or other metals, or metalloids, are present in the complex ores these metals, or metalloids, may be separated from the other metals obtained, or be dealt with according to any known, or suitable, method of effecting such separation.

After, or before, the precipitation of the heavy non-ferrous metals, I may remove the gangue and precipitated oxid (leaving pure anhydrous magnesium, calcium, sodium, or potassium, chlorids) which may be effected by any suitable means such as by pouring the fused chlorids through a filtering medium, such, for example, as a bed of charcoal, or sand, whereby complete filtration takes place very rapidly owing to the extremely low viscosity of these chlorids. The magnesium, calcium, sodium, or potassium, chlorid is then ready for treatment in the electrolytic apparatus.

The property of extremely ready and rapid filtration in a fused state is peculiarly marked in anhydrous magnesium, or calcium, chlorids, or a mixture of these, alone, or together with alkali metal chlorids, and this property constitutes a most valuable adjunct to the herein described cyclic process. Mixtures of any of the aforesaid chlorids also preserve their fluidity at comparatively low temperatures.

If the precipitation of the gangue and the iron and manganese, as infusible oxids, and their separation, be effected previously to the precipitation of the heavy non-ferrous metals, the chlorids of the said metals, which will then be in the melt, will not prevent its free filtration, provided the amount of the chlorid of the initial melt which is present be sufficient.

In some cases, however, I may dissolve the melt in water and thus separate the solid matter and reconcentrate (and dehydrate) the whole, or a portion, of the chlorids and I do not limit my invention to the separation of the chlorids from the gangue (or gangue and oxids, as the case may be) in the fused state as aforesaid.

For the electrolytic preparation of the alloys I employ the fused chlorids recovered as hereinbefore described from the converter, or precipitator, as electrolyte, and either metallic zinc, or metallic lead, as the receiving cathodes, the alloy of magnesium, calcium, sodium, or potassium, with the lead, or zinc, being usually made up to between 10 and 30 per cent. of the lighter metals.

When an ore containing both lead, (or silver), and zinc, is being treated the plant may be arranged accordingly with a suitable number of electrolytic cells with lead cathodes and a suitable number with zinc cathodes which cathodes are employed in a molten condition.

I may carry out the hereinbefore described process in conjunction with the recovery of the metals magnesium, calcium, sodium, or potassium, for use as such, or for use in alloys with lead, or zinc. In the specification of my application No. 317083 for Letters Patent I have described a method suitable for recovering magnesium as metal and a similar method may be adopted for recovering calcium. Sodium, or potassium, or their alloys, may be recovered in any known, or suitable, way. The whole of the chlorin from the electrolytic operations may be passed into the converters and the sulfur, or sulfur compounds obtained from the converters may be collected and utilized in any suitable way. I may obtain in several useful forms, all the sulfur contained in the ores by varying the procedure in the converter slightly, for example, by always employing an excess of ore in the converter charge and working at a fairly high temperature and excluding air entirely. I can obtain pure sulfur. By admitting air under otherwise similar conditions I can obtain $SO_2$ whereas by working at a lower temperature and with an excess of chlorin and keeping the ore supply low I can obtain sulfuryl chlorid, a useful and valuable by-product. The precise form however of the sulfur products obtained does not in itself form any part of the present invention. It is to be understood that I may employ the alloys and chlorids of magnesium, calcium, sodium and potassium either separately, or in any desired combination.

The hereinbefore described succession of operations in accordance with my invention constitutes a cyclic process of great simplicity, economy and efficiency, whereby the metals in sulfid ores, or oxidized ores, of the non-ferrous metals of the nature described, can be completely recovered, and such by-products be obtained as will add materially to the profits of the treatment. The chlorin is used cyclically. The magnesium, calcium, sodium, or potassium, introduced into the cycle (with the oxid used for precipitation of iron and manganese if they, or either of them, be present) is moreover an overplus from the true cycle and may be sold as a by-product either as metal, or as an alloy with other metals, for instance, with lead, or zinc, this also adding materially to the profits.

The labor, wear and tear, capital outlay and other charges which go to make up the costs of treatment in a metallurgical plant, are all extremely small in this cycle and likewise the electric energy required is small, being approximately 2.5 kilo-watt hours per pound of zinc, or equivalent products (say 0.8 K. W. hours per lb. of lead, or say 7.5 K. W. hours per pound of free metallic magnesium or 6.8 kilowatt hours per pound of magnesium in alloys).

Small losses of chlorin may be made up from any convenient exterior source, such for instance, as from an adjacent alkali installation when large plants are employed. The several chemical reactions which take place in the hereinbefore described cyclic process are, individually considered, well known to chemists and I do not claim them *per se* as of my invention, nor do I claim, in itself, the method of decomposing either sulfid, or oxidized, ores in a converter with chlorin, or chlorin-yielding gases.

As far as I am aware, however, the employment of the metals magnesium, calcium, or the alkali metals, and their fused salts, in the manner described has never before been suggested.

My invention, while comprising several known operations, constitutes an entirely novel process and can with especial advantage be worked as a cyclic process of the greatest value. I do not limit my invention to the precise methods of working, or the particular materials herein described, or mentioned, as I may employ it in any suitable manner for any of the purposes indicated.

To further make the nature of my invention and how it may be carried out, quite clear I give the following example wherein, for simplicity of description, I will presume that the metal magnesium (alloyed with either zinc or lead) is used as the active metal in the precipitation of the heavier metals. The process will be worked with calcium in a similar manner.

Example 1: The ore selected for treatment is 100 metric tons of the "Burma Corporation ore" hereinbefore mentioned.

To stock the plant it is assumed that 5 tons of pure fused anhydrous magnesium chlorid are contained in the converters and precipitating vessels and 5 tons of the same material are contained in the electrolytic plant.

The reactions which take place may be briefly stated thus:—

*Converter.*

(a) $ZnS+Cl_2=ZnCl_2+S$
(b) $PbS+Cl_2=PbCl_2+S$
(c) $Ag_2S+Cl_2=2AgCl+S$
(d) $2FeS_2+3Cl_2=Fe_2Cl_6+4S$
(e) $3MgO+Fe_2Cl_6=Fe_2O_3+3MgCl_2$

*Precipitator.*

(f) $2AgCl+PbMg^*=MgCl_2+PbAg_2^*$
(g) $PbCl_2+PbMg^*=MgCl_2+2Pb$
(h) $ZnCl_2+ZnMg^*=MgCl_2+2Zn$

*Electrolysis.*

(k) $MgCl_2+current+Pb=MgPb^*+Cl_2$
(l) $MgCl_2+current+Zn=ZnMg^*+Cl_2.$

The formulæ for the alloys marked * are empirical as the alloys may be employed of any preferred proportions of the component metals.

Working out the foregoing formulæ on 100 tons of ore, of the composition hereinbefore given, the following theoretical intake and output for the process are obtained.

*Intake.*

Mixed sulfid ore, 100 tons.
$MgCl_2$ (stock), 10 tons.
MgO, 2.2 tons (or equivalent CaO) say 3 tons.
Electricity say 225,000 K. W. hours.

*Output.*

Valuable:
  Silver, 1 ton.
  Lead, 40 tons.
  Zinc, 20 tons.
  Sulfur, 18 tons.
  Magnesium metal, 1.3 tons (or equivalent calcium metal say 1.5 tons).
  Magnesium chlorid (stock), 10 tons.
Worthless:
  Gangue matter, 18 tons.
  Iron oxid, 6 tons.

The accompanying diagram will serve to explain an arrangement of apparatus, or plant, by means of which the process according to my invention may be carried out.

A, represents the container of the ore to be treated; B, the container of say, for example, magnesium oxid; C, the converter plant; D, the precipitation plant; E, the filtration plant and F the electrolytic plant. $a\ c$ and $b\ c$ represent the passages from the containers A and B, to the converter plant C. The passage for the mixed chlorids from the converter plant C, to the precipitation plant D, is marked $c\ d$, the passage for the magnesium chlorid from the precipitation plant D to the filtration plant E is marked $d\ e$ and the passage for the filtered magnesium chlorid from the filtration plant E, to the electrolytic plant F, is marked $e\ f$. $c$ indicates the output of sulfur, or sulfur compounds, from the converter plant C. The outputs of silver, lead, and zinc, from the precipitation plant D, are respectively marked $d^1$ $d^2$ and $d^3$. The output of waste gangue (or gangue and iron, or manganese, oxids or both) from the filtration plant E, is marked $e$ and the output of magnesium from the electrolytic plant F, is marked $f$. The passage of lead and zinc from the precipitation plant D, to the electrolytic plant F, is indicated by $d\ f$ and the return passages of alloys of lead-magnesium and of zinc-magnesium from the electrolytic plant F to the precipitation plant D, are indicated at $f\ d$. The passage for chlorin gas from the electrolytic plant F, to the converter plant C, is marked $f\ c$.

It will be clear from the above description that, if desired, the positions of the precipitation plant D and the filtration plant E may be reversed so that the removal of the gangue, (or gangue and ferric, or manganic, oxid) takes place prior to the precipitation of the valuable metals instead of after it.

In the following claims I use the expression "heavy and light metals" in a sense broad enough to include under the term "heavy metals," lead or zinc or both lead and zinc, and under the term "light metals" I include potassium, sodium, calcium and manganese or any of them.

What I claim is:—

1. The process of treating metal bearing materials, which comprises the steps of converting a metal constituent of the material into a chlorid, and combining the latter with an alloy of heavy and light metals to effect the precipitation of the metal from the chlorid, substantially as described.

2. The process of treating metal bearing materials, which comprises the steps of converting a metal constituent into a chlorid, converting any iron or manganese present into oxid, and precipitating the chlorid metal by combining the chlorid with an alloy of heavy and light metals, substantially as described.

3. The process of treating metal bearing materials, which comprises the steps of subjecting said material to the action of chlorin while suspended in a mobile fused melt, to form chlorids of the metals, and precipitating the metals from the chlorids by combining with the latter an alloy of heavy and light metals, substantially as described.

4. The process of treating metal bearing materials, which comprises the steps of subjecting said material to the action of chlorin while suspended in a mobile fused melt, to form chlorids of the metals, and fractionally precipitating the metal from the chlorids by combining with the latter suitable proportions of an alloy of heavy and light metals, substantially as described.

5. The process of treating metal bearing materials, which comprises the steps of converting a metal constituent of the material into a chlorid, and combining the latter with an alloy of heavy and light metals to effect the precipitation of the metal from the chlorid, and electrolyzing the remaining chlorids with a cathode of the heavy metal so as to reform the alloy for reuse.

6. The process of treating metal bearing materials, which comprises the steps of subjecting the materials to the action of chlorin in a mobile fused melt in a converter to form chlorids of the metals, and fractionally precipitating the desired metals by combining the chlorid with an alloy of heavy and light metals.

7. The process of treating metal bearing materials, which comprises the steps of subjecting the materials to the action of chlorin in a mobile fused melt in a converter to form chlorids of the metals, converting any iron or manganese present into oxid by precipitating with oxid of a light metal, and fractionally precipitating the desired metals by combining the chlorid with an alloy of heavy and light metals.

8. The process of treating metal bearing materials, which comprises the steps of converting a metal constituent into a chlorid, and combining the latter with an alloy of heavy and light metals to effect the precipitation of the metal from the chlorid, and electrolyzing the remaining chlorids with a cathode of the heavy metal so as to reform the alloy for reuse, and filtering the chlorids at a suitable stage of the process to remove the gangue in advance of the electrolysis.

9. The process of treating metal bearing materials, which comprises the steps of subjecting the material to the action of chlorin in a mobile fused melt in a converter to form chlorids of the metals, and fractionally precipitating the desired metals by combining the chlorids with an alloy of heavy and light metals, and electrolyzing the remaining chlorids with a cathode of the heavy metal so as to reform the alloy for reuse.

10. The process of treating metal bearing materials, which comprises the steps of subjecting the materials to the action of chlorin in a mobile fused melt in a converter to form chlorids of the metals, converting any iron or manganese present into oxid by precipitating with oxid of a light metal, and fractionally precipitating the desired metals by combining the chlorid with an alloy of heavy and light metals, and electrolyzing the remaining chlorids with a cathode of the heavy metal so as to reform the alloy for reuse, the chlorids being filtered at a suitable stage of the process to remove the gangue in advance of the electrolysis.

In testimony whereof I have signed my name to this specification in the presence of two subscribing witnesses.

EDGAR ARTHUR ASHCROFT.

Witnesses:
H. F. MICHELMORE,
V. C. HAM.